(12) United States Patent
Eckert

(10) Patent No.: US 10,298,092 B2
(45) Date of Patent: May 21, 2019

(54) DYNAMO-ELECTRIC MACHINE WITH A BRAKE

(71) Applicant: SIEMENS AKTIENGESELLSCHAFT, München (DE)

(72) Inventor: Frank Eckert, Hausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 235 days.

(21) Appl. No.: 14/969,850

(22) Filed: Dec. 15, 2015

(65) Prior Publication Data

US 2016/0172932 A1    Jun. 16, 2016

(30) Foreign Application Priority Data

Dec. 16, 2014   (EP) ..................... 14198182

(51) Int. Cl.
*H02K 7/102* (2006.01)

(52) U.S. Cl.
CPC ........... *H02K 7/102* (2013.01); *H02K 7/1025* (2013.01)

(58) Field of Classification Search
CPC ............................ H02K 7/102; H02K 7/1025
USPC ..................................... 310/76, 77
IPC ..................................... H02K 7/102
See application file for complete search history.

(56) References Cited

U.S. PATENT DOCUMENTS

| | | | | |
|---|---|---|---|---|
| 1,972,715 | A * | 9/1934 | Pleister ................. | F16B 13/124 411/42 |
| 3,171,322 | A * | 3/1965 | Kaplan ................. | F16B 13/065 411/60.1 |
| 4,734,604 | A * | 3/1988 | Sontheimer ............ | H02K 7/125 188/171 |
| 6,536,563 | B1 * | 3/2003 | Schlehbusch ........... | F16D 55/28 188/161 |
| 7,944,102 | B2 | 5/2011 | Eckert | |
| 9,133,630 | B2 * | 9/2015 | Dougherty ............ | F16B 13/128 |
| 2001/0053913 | A1 * | 12/2001 | Freedland .......... | A61B 17/0401 606/232 |
| 2009/0127950 | A1 * | 5/2009 | Eckert .................. | H02K 7/1025 310/77 |
| 2009/0251016 | A1 * | 10/2009 | Zisler ..................... | H02K 7/102 310/77 |
| 2016/0172932 | A1 * | 6/2016 | Eckert .................... | H02K 7/102 310/77 |

FOREIGN PATENT DOCUMENTS

| | | |
|---|---|---|
| CN | 2684445 Y | 3/2005 |
| DE | 22 42 073 A1 | 3/1974 |
| DE | 10 2006 032 992 A1 | 1/2008 |
| EP | 1 536 544 A2 | 6/2005 |

* cited by examiner

*Primary Examiner* — John K Kim
(74) *Attorney, Agent, or Firm* — Henry M. Feiereisen LLC

(57) ABSTRACT

A dynamo-electric machine includes a stator and a rotor interacting with the stator and including a laminated core. A shaft configured for rotation about an axis is connected to the rotor in a torsion-resistant manner. Arranged at least on an axial front side of the rotor is a brake which includes a brake rotor that is directly connected to the laminated core of the rotor.

12 Claims, 3 Drawing Sheets

DYNAMO-ELECTRIC MACHINE WITH A BRAKE

CROSS-REFERENCES TO RELATED APPLICATIONS

This application claims the priority of European Patent Application, Serial No. 14198182.9 filed Dec. 16, 2014, pursuant to 35 U.S.C. 119(a)-(d), the disclosure of which is incorporated herein by reference in its entirety as if fully set forth herein.

BACKGROUND OF THE INVENTION

The present invention relates to a dynamo-electric machine.

The following discussion of related art is provided to assist the reader in understanding the advantages of the invention, and is not to be construed as an admission that this related art is prior art to this invention.

Dynamo-electric machines are frequently decelerated during their dynamic operation and/or kept in a defined stationary position. To this end, specially arranged brakes are provided on rotating parts of the dynamo-electric machine.

The rotors of backlash-free mounting brakes, also referred to as brake rotors in conventional dynamo-electric machines, are mounted with a rigid shaft-hub connection on a motor shaft, much like actual rotors of a dynamo-electric machine. Such mounting produces a two-mass vibration system, composed of a brake rotor connected in a torsion-resistant manner to a shaft and a rotor of a dynamo-electric machine. Under certain conditions, a two-mass vibration system generates resonance vibrations which disrupt motor operation, hampering or making position control or drive control impossible.

Such disruptive resonance vibrations were previously simply resolved by a design change to the shaft, a laminated core of the rotor or the brake, in order to shift these vibrations during normal operating conditions of the dynamo-electric machine into non-critical frequency ranges. The disadvantage is the comparatively high expense, which, among other things, results from an individual analysis of each dynamo-electric machine and associated remedies.

It would therefore be desirable and advantageous to address prior art problems and to obviate other prior art shortcomings.

SUMMARY OF THE INVENTION

According to one aspect of the present invention, a dynamo-electric machine, including a stator, a rotor interacting with the stator and including a laminated core, a shaft configured for rotation about an axis and connected to the rotor in a torsion-resistant manner, and a brake arranged at least on an axial front side of the rotor, said brake including a brake rotor which is directly connected to the laminated core of the rotor.

According to another advantageous feature of the invention, the laminated core can be made of axially laminated sheets. Of course, the core of the rotor need not necessarily be laminated, and can instead be embodied as a sintered one-piece or multi-piece part.

As a result of the inventive design of the rotating parts of the dynamo-electric machine, i.e. the brake rotor on the rotor of the dynamo-electric machine, the need for a two-mass vibration system is eliminated. The laminated cores of the rotor and the brake rotor are rigidly connected to one another in the axial and/or radial direction and similarly in the peripheral direction. Advantageously, the overall configuration of the dynamo-electric machine and the brake thus also becomes comparatively compact.

According to another advantageous feature of the invention, the brake rotor can be axially mounted on the front side of the rotor.

According to another advantageous feature of the invention, the brake rotor can be mounted on the rotor by at least one spreading apparatus as the at least one spreading apparatus becomes wedged in an axial recess of the laminated core of the rotor. This produces a compact mass, namely the brake rotor together with the rotor, which has to be decelerated or accelerated and thus avoids vibrations during alternating operating states of the dynamo-electric machine. Advantageously, the at least one spreading apparatus is an expansion bolt.

A coupling of the two masses, brake rotor and rotor of the dynamo-electric machine across the shaft, which can thus be excited to torsion vibrations, is thus avoided in accordance with the present invention. During highly dynamic processes of the drive, torsion vibrations of the shaft as a result of the two masses are avoided, thereby enabling or simplifying the regulation of the drive.

The brake rotor together with the rotor produce a compact mass, which undergoes braking or acceleration, and therefore avoids vibrations during alternating operating states of the dynamo-electric machine.

According to another advantageous feature of the invention, the brake rotor can include an anchor having at least one area complementing an axial recess of the rotor for axially receiving an element, with the anchor having at least one slot which spreads as the element is positioned in the anchor and thereby becomes wedged in an axial recess of the rotor in a torsion-resistant manner. Advantageously, the element is a screw or a bolt. As a result of mounting of the brake rotor on the rotor in accordance with the present invention by way of elements, such as screws or bolts, which cause the anchor to spread in the axial recess of the rotor, heat-shrinking of the brake rotor on the shaft is of no concern.

Similarly, other rotor elements normally positioned directly on the shaft, such as balance disks, fan disks, and end plates of the rotor, can be mounted on the rotor directly on a front side of the rotor of the dynamo-electric machine in order to avoid torsion vibrations.

According to another aspect of the present invention, a machine tool or positioning drive includes a dynamo-electric machine which comprises a stator, a rotor interacting with the stator, said rotor including a laminated core, a shaft configured for rotation about an axis and connected to the rotor in a torsion-resistant manner, and a brake arranged at least on an axial front side of the rotor, said brake including a brake rotor which is directly connected to the laminated core of the rotor.

The present invention resolves prior art shortcomings by not only eliminating a two-mass vibration system of rotating parts of the dynamo-electric machine, namely the brake rotor on the rotor of a dynamo-electric machine, but also other rotor elements normally positioned directly on the shaft, such as balance disks, fan disks, end plates of the rotor, can now be mounted on the rotor directly on the front side of the rotor of the dynamo-electric machine in order to avoid torsion vibrations.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
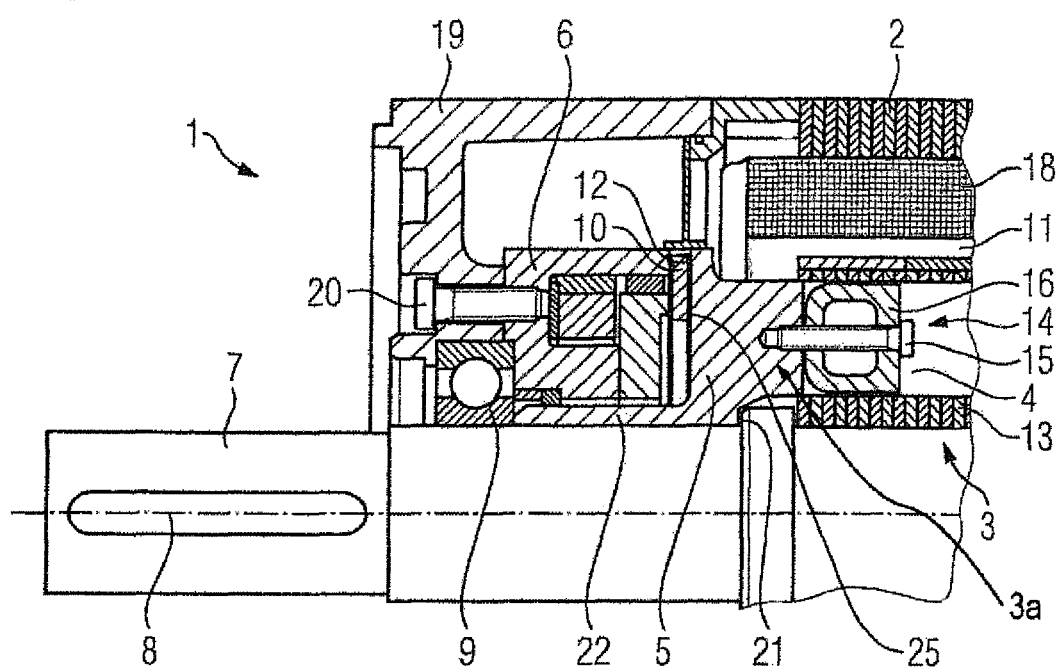
FIG. 1 shows a partial longitudinal section of a brake mounted on a rotor of a dynamo-electric machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a partial longitudinal section of a rotor 3 of a dynamo-electric machine 1 according to the present invention. The rotor 3 is rotatably mounted about an axis 8 and connected to a shaft 7 in a torsion-resistant manner. A brake is arranged at least on an axial front side 3a of the rotor 3. The brake includes a brake rotor 5 with a sleeve-shaped axial extension 22, which points away from the rotor 3, is disposed on a front side of the rotor 3. The brake rotor 5 is advantageously connected in a one-piece or multi-piece manner to a laminated core 13 of the rotor 3 by way of an expansion bolt system 14, shown in FIG. 2.

FIG. 1 also shows a stator 2 including an electrically powered winding system 18, which is embodied as tooth coils or corded coils and is disposed in grooves of the stator 2 (not shown in further detail). An electromagnetic interaction of the winding system 18 of the stator 2 and the rotor 3 via an air gap 11 of the dynamo-electric machine 1 produces a rotation of the rotor 3 about the axis 8.

Although not shown in detail, a working machine can be connected by way of a feather key connection of the shaft 7.

The shaft 7 is held by a bearing 9, which is positioned in a bearing shield 19.

The rotor 3 is assembled to form a laminated core 13 by axially laminated sheets, the laminated core 13 being connected to the shaft 7 in a torsion-resistant manner and having axially running recesses 4. The laminated core 13 has preferably been heat shrunk onto the shaft 7. These axially running recesses 4 serve, inter alia, to receive the expansion bolt system 14, with which the brake rotor 5 is held directly on the laminated core of the rotor 3.

The brake rotor 5 also includes, in the vicinity of the shaft 7, an axial sleeve-shaped extension 22 in a direction of the bearing 7, providing a sealing function between the shaft 7 and the sleeve-shaped extension 22. The sleeve-shaped extension 22 is however not connected to the shaft 7 in a torsion-resistant manner, but instead has an excess. In the space formed by the excess, the sealing function can however be improved by a labyrinth-type design of the shaft 7 and/or sleeve-shaped extension 22.

The shaft 7 includes a shaft stop 21 which facilitates, inter alia, assembly of the brake rotor 5 and the rotor 3. A specifiable gap can be preset between the front side of the rotor 3 and the brake rotor 5, so that the axially running recesses 4, provided they are not all occupied by expansion bolts, also serve to cool the rotor 3 and/or the brake rotor 5.

To develop a brake effect, a brake disk 10 is arranged on a surface 25 of a brake body 6 or on the brake rotor 5. A corresponding circuit-closing or closed-circuit connection of an electromagnetic system, which is arranged in the brake body 6, respectively opens or closes a brake gap 12, and thus results, among other things, in braking or fixing an idle state of the rotor 3. The brake body 6 is arranged on the bearing shield 19 by a mounting 20.

Figure 2:
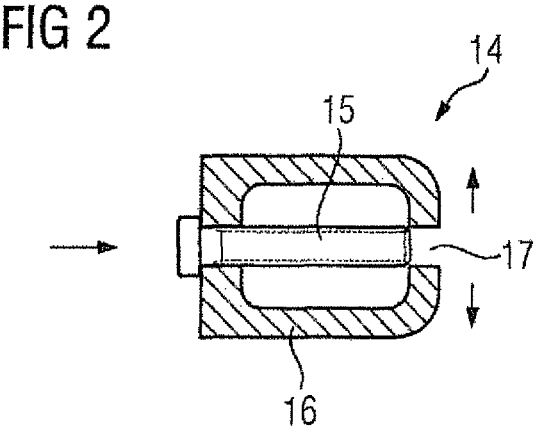
FIG. 2 shows a sectional view of an expansion bolt system of FIG. 1.

FIG. 2 shows a more detailed view of the expansion bolt system 14 of FIG. 1 in a sectional view, in which a screw 15 can be screwed into a pivot 16. On account of the design of the pivot 16 with slots 17, a widening of at least two pivot sides occurs when the screw 15 is inserted. The brake rotor 5 is fixed to the rotor 3 by inserting the screw 15, advantageously by way of the axially running recess 4 from the side of the rotor 3 facing away from the brake rotor 5. Thereby, the expansion bolt system 14 becomes wedged together through widening sides of the pivot 16 when the screw 15 is inserted into the axially running recess 4 of the rotor 3. The screw 15 itself engages into a thread provided in the brake rotor 5, as shown in FIG. 1.

Figure 3:
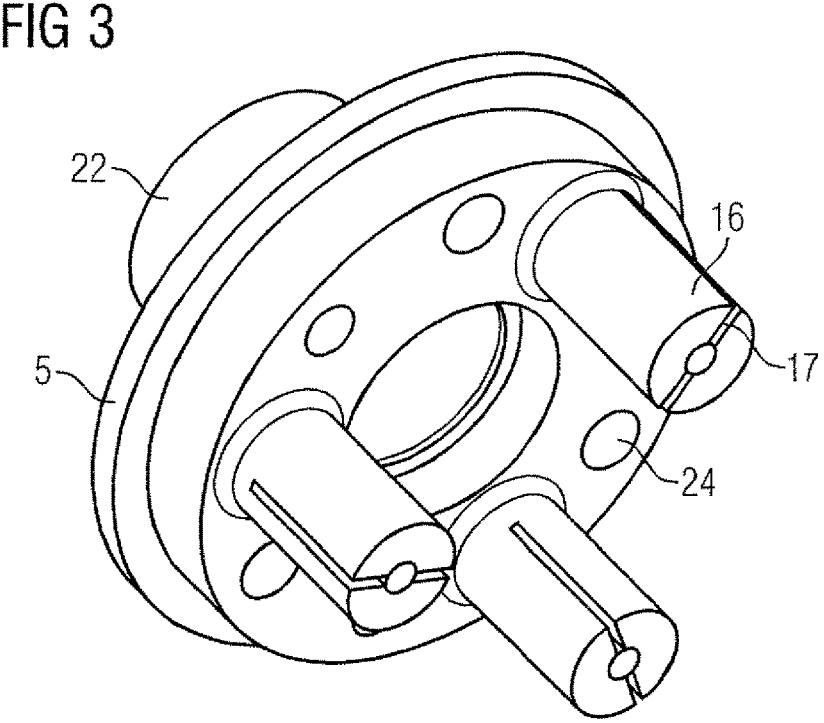
FIG. 3 shows a perspective view of a further embodiment of a brake rotor of FIG. 1.

FIG. 3 shows a perspective view of the brake rotor 5 of FIG. 1. In this embodiment, three anchors 16 are arranged on the brake rotor 5. When the brake rotor 5 is integrated on a front side of the rotor 3, the three anchors 16 each protrude into an axial recess 4 of the rotor 3. Unlike the embodiment shown to FIG. 1, the brake rotor 5, anchor 16, and axial sleeve-shaped extension 22 here form a one-piece element of unitary structure. The pivots 16 are likewise embodied with slots 17 and have a central borehole. The brake rotor 5 has a number of openings 24 distributed peripherally, which preferably correspond to the axially running recesses 4 of the rotor 3. This arrangement facilitates assembly of the brake rotor 5 on a front side of the rotor 3, and provides for cooling of the rotor 3 across openings 24 or axial recesses 4 which are not occupied by the anchor 16.

Figure 4:
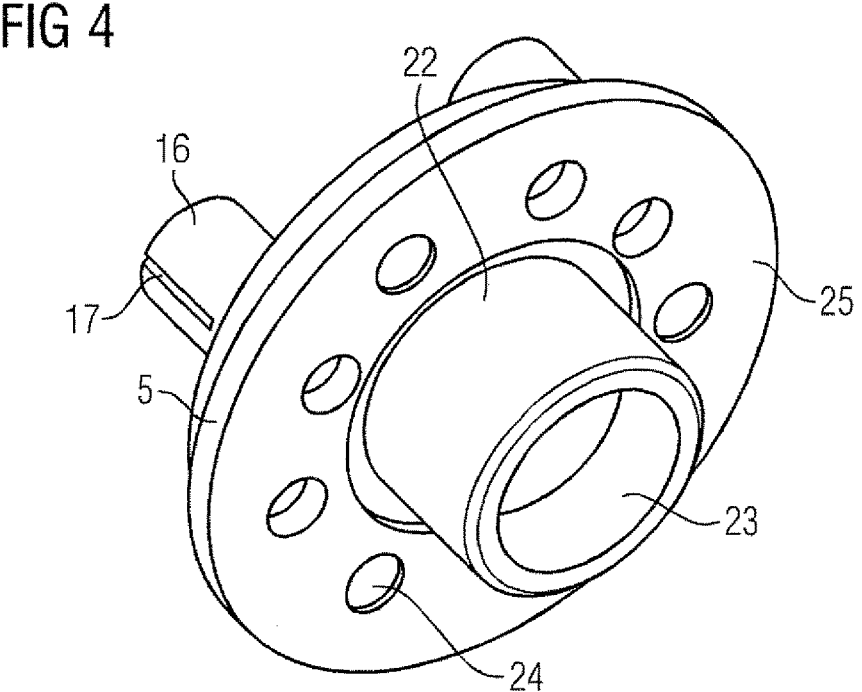
FIG. 4 shows another perspective view of a brake rotor of FIG. 4.

FIG. 4 shows a further perspective view of the brake rotor 5 of FIG. 3, showing the axial sleeve-shaped extension 22 of the brake rotor 5. Similarly, peripherally distributed openings 24 are shown, through which a screw 15 can be used to spread the anchor 16.

The anchor 16 can thus essentially be spread by screwing in a screw 15 or inserting a bolt from either side of the brake rotor 5.

Figure 5:
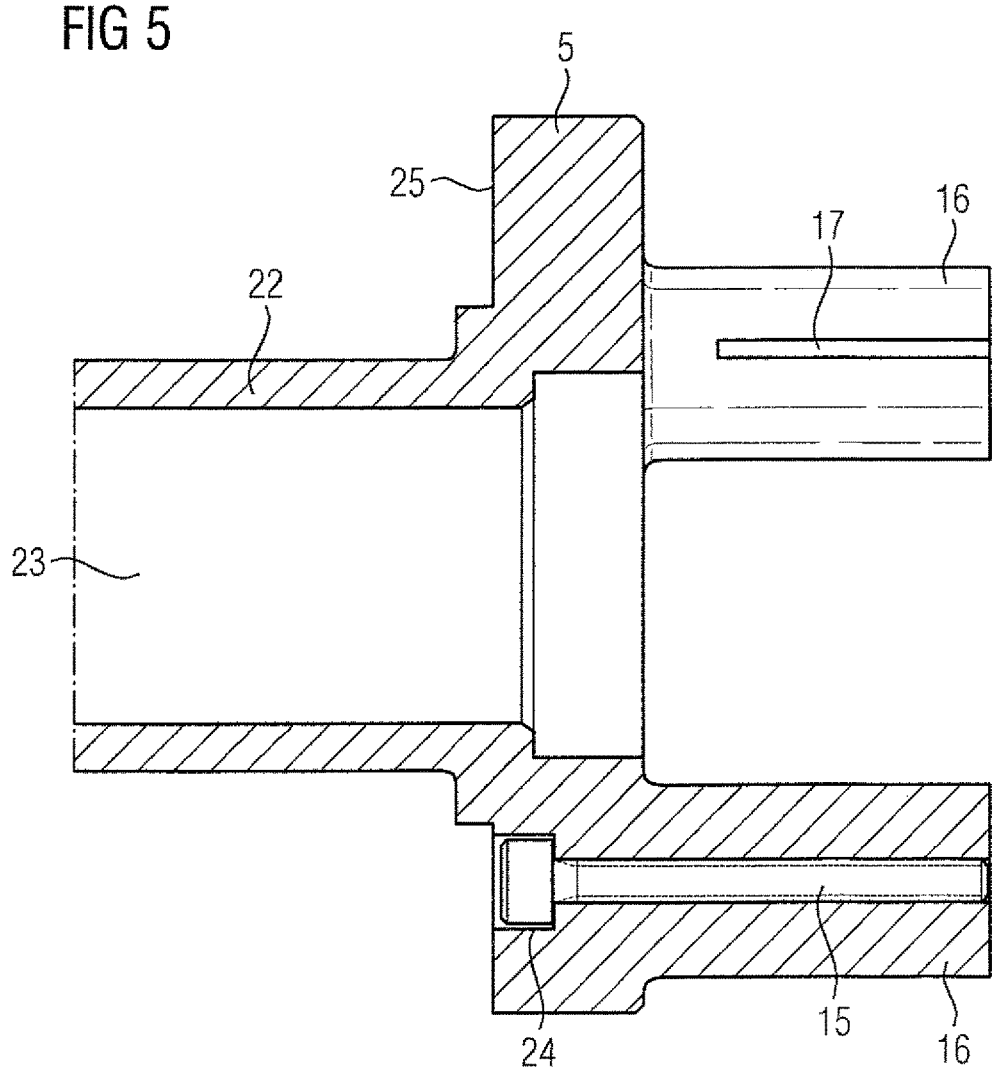
FIG. 5 shows a longitudinal section of a brake rotor according to the present invention.

FIG. 5 shows the brake rotor 5 in a longitudinal section, with a screw 15 disposed in a anchor 16. In this embodiment, the screw 15 is inserted from a side facing away from the rotor 3. The anchor 16 is spread by screwing the screw 15 into the borehole of the anchor 16. A brake disk 10 can be positioned on the surface 25, which, if necessary, has openings corresponding to the openings 24 in the brake disk 10.

The brake rotor 5 is therefore mounted on the rotor 3 by separate expansion bolt systems 14 according to FIG. 1 and FIG. 2, wherein elements, such as screws 15 or bolts (not shown), are positioned in the anchor 16 by way of the axially running recesses 4 of the rotor 3, thereby spreading the anchor 16 and producing a wedging in the axially running recess 4. Alternatively, a wedging is also achieved in the axially running recess 4 of the rotor 3 in the case of separate expansion bolt systems 14, wherein the screws 15 or bolts (not shown) can be inserted from a side facing away from the rotor 3, as shown by a one-piece embodiment of the brake rotor 5, sleeve-shaped extension 22, and anchor 16 according to FIG. 5. Even with the one-piece construction of the brake rotor 5, sleeve-shaped extension 22, and anchor 16, a positioning of elements such as the screws 15 or bolts (not shown) can take place from both sides of the brake rotor 5 in order to fix to the rotor 3.

Brakes for dynamo-electric machines are used mostly in machine tools and/or positioning drives in order to procure or transport tools or workpieces. A precise arrangement of the drives is therefore necessary in order to ensure prescribed safety requirements and quality standards of manufactured products.

Disadvantages associated with a two-mass vibration system occur not only when brake motors 5 are mounted on the rotor 3, but also when other elements, such as fan blades, balancing masses, masses for increasing inertia, balance disks, etc. are mounted on the rotor 3. Such elements are, in terms of their mounting on the rotor 3, similarly structurally equipped with anchor 16 according to FIGS. 3, 4, and 5 or a separate expansion bolt system 14 according to FIG. 1 and FIG. 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A dynamo-electric machine, comprising:
   a stator;
   a rotor interacting with the stator and including a laminated core;
   a shaft configured for rotation about an axis and connected to the rotor in a torsion-resistant manner; and
   a brake arranged at least on an axial front side of the rotor, said brake including a brake rotor which is directly connected to the laminated core of the rotor,
   wherein the brake rotor includes an anchor having at least one area complementing an axial recess of the rotor for axially receiving an element, said anchor having at least one slot traversing the circumference of the anchor which spreads as the element is positioned in the anchor and thereby the anchor becomes wedged in an axial recess of the rotor in a torsion-resistant manner, wherein said anchor has a circular wall extending along a length of the anchor with radially outer and radially inner concentric surfaces and with the slot traversing a part of a length of a longitudinal portion of the circular wall, and two end walls provided at two opposite longitudinal ends of the circular wall and both extending radially inwardly from the circular wall,
   wherein one of the end walls has an uninterrupted circular opening, while the other of the end walls has a circular opening and a transverse slot communicating said circular opening with the longitudinal slot.

2. The dynamo-electric machine of claim 1, wherein the laminated core is made of axially laminated sheets.

3. The dynamo-electric machine of claim 1, wherein the brake rotor is axially mounted on the front side of the rotor.

4. The dynamo-electric machine of claim 1, further comprising at least one spreading apparatus, said brake rotor being mounted to the rotor by the at least one spreading apparatus as the at least one spreading apparatus becomes wedged in an axial recess of the laminated core of the rotor.

5. The dynamo-electric machine of claim 4, wherein the at least one spreading apparatus is an expansion bolt.

6. The dynamo-electric machine of claim 1, wherein the element is a screw or a bolt.

7. A machine tool or positioning drive, comprising a dynamo-electric machine which comprises a stator, a rotor interacting with the stator and including a laminated core, a shaft configured for rotation about an axis and connected to the rotor in a torsion-resistant manner, and a brake arranged at least on an axial front side of the rotor, said brake including a brake rotor which is directly connected to the laminated core of the rotor, wherein the brake rotor includes an anchor having at least one area complementing an axial recess of the rotor for axially receiving an element, said anchor having at least one slot traversing the circumference of the anchor which spreads as the element is positioned in the anchor and thereby the anchor becomes wedged in the axial recess of the rotor in a torsion-resistant manner, wherein said anchor has a circular wall extending along a length of the anchor with radially outer and radially inner concentric surfaces and with the slot traversing a part of a length of a longitudinal portion of the circular wall, and two end walls provided at two opposite longitudinal ends of the circular wall and both extending radially inwardly from the circular wall, wherein one of the end walls has an uninterrupted circular opening, while the other of the end walls has a circular opening and a transverse slot communicating said circular opening with the longitudinal slot.

8. The machine tool or positioning drive of claim 7, wherein the laminated core is made of axially laminated sheets.

9. The machine tool or positioning drive of claim 7, wherein the brake rotor is axially mounted on the front side of the rotor.

10. The machine tool or positioning drive of claim 7, further comprising at least one spreading apparatus, said brake rotor being mounted to the rotor by the at least one spreading apparatus as the at least one spreading apparatus becomes wedged in an axial recess of the laminated core of the rotor.

11. The machine tool or positioning drive of claim 10, wherein the at least one spreading apparatus is an expansion bolt.

12. The machine tool or positioning drive of claim 10, wherein the element is a screw or a bolt.

* * * * *